United States Patent Office 2,936,293
Patented May 10, 1960

2,936,293
METHOD OF REACTING MONOESTERS OF FATTY ACIDS AND PENTAERYTHRITOL WITH AROMATIC DIISOCYANATES AND PREPARING POROUS RESINS THEREFROM

George Otto Orth, Jr., Seattle, Wash., assignor, by mesne assignments, to Minnesota Mining and Manufacturing Company, St. Paul, Minn., a corporation of Delaware No Drawing. Application November 28, 1952
Serial No. 323,129
13 Claims. (Cl. 260—2.5)

This invention relates to a porous resin body and to the method of forming the same. The invention is particularly useful in the production of a cellular resin product which sets at or below room temperatures and which is capable of penetrating all corners of odd-shaped cavities to provide a cellular material filling the cavities and adhering to the walls about the cavities.

This application is a continuation-in-part of my copending application, Serial No. 103,966, filed July 9, 1949, and now abandoned.

In the manufacture of light-weight constructions, it has been the practice to use a core material to give greater strength-weight ratios and also to dampen vibration tendencies. Laminated constructions comprising thin metal or plywood facings have been fabricated, employing as core stock such light-weight materials as balsa wood, prefoamed polystyrene, foamed cellulose structures, and some resorcin-formaldehyde materials that foam in situ. The prefoamed cores present many fabricating problems. Many, such as polystyrene foams, are not dimensionally stable or structurally strong at elevated temperatures. Further, the thermosetting types have not been controllable and have not adhered to the cavity walls. Also, in foaming rubber, resorcin resins, it has been necessary to add heat and a foaming ingredient such as $NaHCO_3$, and no adhesive has been heretofore found which provides its own foaming ingredient, and at the same time develops sufficient internal heat of reaction to effect a thorough cure.

An object of the present invention is to provide a new composition forming a thermoset porous structure of controllable density, the structure consisting of a resin adherent to the cavity wall. Another object is to produce an adhesive resinous material which provides its own heat for curing and its own foaming ingredient without the addition of chemicals such as sodium bicarbonate and which, in reacting, liberates $CO_2$ gas whereby the resulting foam penetrates all corners of an odd-shaped cavity with a substantially uniform structure. A further object is to provide a method for controlling the density of such a porous thermoset, foamed resin structure when foamed in situ in a cavity and while securing adherence to the cavity walls. A still further object is to provide a method by which a resinous compound is reacted with water or other compound containing an active hydrogen and in the presence of a catalyst, the density of the porous structural resin being controlled by the degree of available active hydrogen. A still further object is to produce a thermoset porous structure of controllable density from the controlled condensation of a polyfunctional isocyanate with the active hydrogens of water, alcohols, amines, etc., the final cross-linking taking place with the elimination of $CO_2$.

Yet another object is to produce a preliminary reaction product of polyfunctional isocyanate with a polyhydroxy compound, the reaction being so controlled that a minimum of condensation takes place and the product being formed by addition and in such molar ratios that free isocyanate groups are still available. A still further object is to produce a two-part formulation, each part of which is relatively stable under normal conditions of handling and which, upon mixing, develops a mobile foam that is rapidly converted to a structurally stable foam of any desired controlled density. Another object is to produce a mobile foam which will spontaneously flow to all parts of a bound area, exerting a pressure against the boundaries of said area to effect complete filling of the entire area regardless of shape. Another object is to produce a foam which sets to a dimensionally stable structure of predetermined density, and which requires no external heating to produce and to set the foam and which requires no subsequent removal of volatile solvent. A still further object is to produce a foamed rigid structure which retains its initial buoyancy for a considerable length of time when immersed in water, and to produce a foam which has inherent adhesion to the surface of the cavity as well as the surface of a previously formed and set foam of the said composition.

Other specific objects and advantages will appear as the specification proceeds.

While the cellular thermoset resin product herein may be produced in a single operation employing a sequence of steps, I have found that there is a substantial advantage and convenience in producing the product in a two-part formulation, each part of which being relatively inert and consequently susceptible to storage over long periods of time at normal temperatures. The development of the foam is accomplished later when the two parts are mixed. In referring to the product as a "thermoset" cellular resin product, it will be understood that the setting is accomplished at room temperatures or at temperatures below room temperatures and that heating of the product for setting is not required. For convenience in the description of the parts, the first part of the formulation will be referred to as part "A" and the second part as part "B."

In my preferred process for forming a porous resin body, an organic isocyanate having at least two isocyanate groups is pre-reacted with a polyhydric alcohol having at least two active hydrogens in the presence of a mutual solvent to form a resinous casting syrup with free isocyanate groups still available. As the next step, the pre-reacted casting syrup thus formed is mixed with a tertiary amine catalyst and a polyhydric alcohol to produce the desired porous resin body. The outstanding features of this method and the porous resin body produced thereby are: (1) the casting syrup can be used at room temperatures; (2) the resin cures without application of external heat; (3) it bonds securely to glass, metal, wood, and most plastics; (4) it is insoluble in water and practically all organic solvents; (5) it can easily be made flame-resistant; (6) controlled core densities can easily be produced; and (7) the method gives controlled reaction times.

In one specific embodiment of my invention, part A may be formed by bringing together pentaerythritol monooleate, pentaerythritol dipropional and metatolylene diisocyanate. The metatolylene diisocyanate is reacted with the pentaerythritol monooleate in such proportions and under such conditions of temperature and time as to produce a liquid resinous composition containing free or unreacted isocyanate groups. It is believed that the three hydrogens of the hydroxyl groups present in the pentaerythritol monooleate have been esentially completely reacted with the isocyanate groups of the metatolylene diisocyanate. It may be that only one isocyanate group of each molecule of metatolylene diisocyanate has taken part in this reaction. It would appear that an excess of isocyanate is used and this might act as a resin solvent as well as a monomer. The pentaerythritol dipropional serves as a mutual solvent for the initial reactants as well as for the addition product during forming. The use of an appropriate solvent reduces the temperature of the reaction, insures better control of the reaction and is believed to inhibit cross-linking of the difunctional isocyanate with the tri-functional pentaerythritol monooleate. Regardless of the accuracy of this theory, I have found that the use of a relatively unreactive solvent, and in particular the use of pentaerythritol dipropional, is highly advantageous in producing a product which subsequently can be made to react with part B of this formulation to produce structurally stable foams having the unformity and physical properties desired.

Instead of metatolylene diisocyanate, any organic isocyanate having at least two isocyanate groups can be used. The hydrocarbon diisocyanates are preferred, such as 2,4-tolylene diisocyanate, methylene (bis) 4-phenyl diisocyanate, ethylene diisocyanate and hexamethylene diisocyanate. Excellent results have been achieved with aromatic diisocyanates and in particular the tolylenediisocyanates.

Instead of pentaerythritol monooleate, any polyhydric alcohol having at least two active hydrogens can be used. The polyhydric alcohol can in part be substituted on the hydroxyl with ester, ether, etc. Among the specific polyhydric alcohols which can be advantageously employed are the following: ethylene glycol, 1,3-butane diol, octalene glycol, glycerol monooleate, glycerol monoethyl ether, hexane triol, pentaerythritol, pentaerythritol mono-stearate, hexose, pentose or sorbitol. Preferably, the polyhydric alcohol employed in the process of this invention is a fairly large molecule, that is, it contains at least 11 carbon atoms. It is also preferred that the polyhydric alcohol does not contain over three active hydrogens. Excellent results have been achieved with the organic acid esters of pentaerythritol containing at least two active hydrogens. These compounds are formed by reacting pentaerythritol with an organic acid in such proportions and under such conditions that the resulting ester contains at least two unreacted hydroxyl groups which provide the active hydrogens.

This is especially pronounced with the fatty acid esters of pentaerythritol, in which an alkyl or alkylene side chain derived from a fatty acid containing from 6 to 22 carbon atoms is attached to the pentaerythritol nucleus. The long alkyl or alkylene side chain imparts solubility with the other components of part "A." Further, it permits better control of the reaction and imparts toughness and flexibility to the structural foam which eventually results from the mixture of part "A" and part "B." In other words, one effect of employing a polyhydric alcohol such as pentaerythritol monooleate is that it functions as a "built-in" plasticizer. However, as indicated above good results can be obtained with other types of polyhydric alcohols, and, if desired, additional plasticizers can be added to the reaction mixture to increase the flexibility of the porous resin body. For example, a monofatty or resin acid ester of polyethylene glycols can be employed as a plasticizer, such as the condensation product of commercial oleic acid (red oil) with ethylene oxide.

Instead of pentaerythritol dipropional, any solvent or partial solvent for the resin may be used as, for example, tricresyl phosphate, pentaerythritol dipropional analogues, dibutyl phthalate, tricresyl citrate, butyl carbitol acetate, or methyl-Cellosolve-acetate. The main function of the solvent is to maintain a solution of the mixture of the polyfunctional isocyanate and the polyhydric alcohol. Therefore it will be understood that a mutual solvent for these reactants should be employed. Best results have been achieved with substantially anhydrous and substantially non-volatile organic solvents of the character indicated.

It is not desirable to have water in part A. When water is present in any amount more than mere traces, it tends to cause the reaction to proceed spontaneously to limits that are undesired.

Part B is essentially a mixture of a tertiary amine with a polyhydric alcohol with or without additions of water. The polyhydric alcohol may be glycerin or any other polyfunctional alcohol although, preferably, it should have at least three reactive hydrogens. However, dihydroxy alcohols can also be advantageously employed. In place of the polyhydric alcohol, there may be substituted any other organic compound which contains at least three active hydrogens as, for example, diethylene triamine. The tertiary amine functions as a catalyst for the reaction of part A with part B, and as the tertiary amine, I much prefer N-methyl morpholine.

I prefer to use a very small amount of N-methyl morpholine because, by reducing the concentration of N-methyl morpholine, longer pot life of the mixture of part A and part B can be attained. As, for example, part B may consist of one part of N-methyl morpholine to 100 parts of glycerin and water may be added to this mixture, preferably up to about 2%. While there may be no critical maximum limit to the amount of water that may be added, an amount above 2% does not achieve any significance in the reduction of density of the final foam product.

Instead of the N-methyl morpholine, any tertiary amine which will dissolve the polyhydric alcohol or be soluble therein, may be employed. As, for example, use may be made of triethyl amine, tripropyl amine, tributyl amine, triamyl amine, tri-2-ethyl hexyl amine, tribenzyl amine, N-alkyl morpholine, pyridine, picolines, alkyl pyridines, vinyl pyridine, trimethylol amine, triethanol amine or triisopropanol amine. These will act as catalysts to accelerate the reaction of the isocyanate resin to liberate carbon dioxide while forming types of resins which are cross-linked. The function of the tertiary amine appears to be the production of a rise in pH, thus causing the isocyanate to react either with itself or with adjacent OH groups. Compounds such as KOH and NaOH do not appear to cause the desired cross-linking, perhaps due to immiscibility. The addition of water to the resin mixture appears to hasten the reaction presumably through ionization of the amine.

When part A and part B are brought together, a reaction takes place that releases $CO_2$ and produces a mobile foam which within a short time sets to a structurally rigid foam which is insoluble and infusible. By controlling the viscosity of part A and by incorporating definite amounts of water in part B, the density of the resulting foam structure can be controlled at will between, say, 1 pound per cubic foot and 25 pounds per cubic foot. The water is believed to act as an ionizer for the potential catalyst, the degree of ionization being determined by the amount of water which is added to part B and which, in turn, determines the rate of reaction when part A and part B are mixed. The rate of reaction, in turn, determines the density of the resulting stable foam.

Specific procedures or examples illustrating the forming of part A and part B separately and a combining of parts A and B may be set out as follows:

I.—Part A may be prepared by any one of the following procedures:

(1) 31.7 gms. (31.7% by weight) of pentaerythritol monooleate and 16.1 gms. (16.1% by weight) of pentaerythritol dipropional are weighed into a three-neck flask equipped with stirrer, thermometer and reflux condenser. The pentaerythritol monooleate and the dipropional are thoroughly mixed in the flask and the temperature dropped to 15° C. by cooling. 52.2 gms. (52.2% by weight) of metatolylene diisocyanate (undistilled) is then weighed into the flask, the temperature of the metatolylene diisocyanate being not above 23–24° C. Without stirring, the flask is then placed on a water bath at 5° C. to 10° C. and the reaction is started by stirring vigorously and holding the temperature below 24° C. The reaction is continued for one hour while allowing the temperature to drop to 15° C.–18° C. After one hour, the reaction is slowly heated at the rate of ½ to ¾ degree per minute until 45° C. is reached. The temperature is then raised to 100° C. at the rate of about 2-3 degrees per minute. The flask is removed from the water bath and direct heat is applied, with constant stirring, to maintain the liquid at 100° C. to 120° C. until approximately "U" Gardner viscosity is obtained. This may take several hours. Upon completion of the bodying, the flask is cooled and the resulting syrup is poured into an air and moisture tight container and preserved for use.

(a) With undistilled metatolylene diisocyanate, I prefer to raise the temperature slowly, as indicated. However, the rate of heating may be varied, and the temperature may go as high as 200° C. or up to the boiling point of the reaction mixture. The time-temperature ratio can be varied at will as long as the reaction is kept under control and then checked at the correct viscosity.

(b) I prefer to use the above percentages. However, they may be varied widely. For example, 1 to 70% pentaerythritol dipropional may be used to impart varying degrees of flexibility. An example of such a formulation would be as follows:

27 gms. (27% by weight) pentaerythritol monooleate
27 gms. (27% by weight) pentaerythritol dipropional
46 gms. (46% by weight) metaolylene diisocyanate.

With the above percentages, the procedural steps of I may be used, varying reaction times and temperatures accordingly. The resulting product when reacted with part B of the formula produces a soft rubbery foam.

(c) The quantity of metaolylene diisocyanate (undistilled) used may vary from 1 to 95% in 1 and from 55% by weight to 95% by weight based on the ratio of metatolylene diisocyanate (distilled) to the pentaerythritol monooleate in 2. An example of this type is as follows:

For preparation as in I:

38.5% by weight pentaerythritol monooleate
19.5% by weight pentaerythritol dipropional
42.0% by weight metatolylene diisocyanate (undistilled).

This formula produces a low viscosity syrup satisfactory for extensions.

(2) Industrial metatolylene diisocyanate is vacuum distilled, preferably at 88° C. at 0.3 mm. and used in the preparation below:

29.5 gms. (29.5% by weight) of pentaerythritol monooleate and 15.0 gms. (15.0% by weight) of pentaerythritol dipropional are mixed as in (1) and 55.5 gms. 55.5% by weight) of metatolylene diisocyanate is added as in (1), and the same procedure is followed until 40° C. is reached. When 40° C. is reached, a careful check of the bodying tendency is made and the temperature is slowly brought to 43-45° C. until a resinous tack is obtained on a cold glass. (A viscosity of "U" Gardner standard.) Immediately upon reaching this stage, 9.25 gms. (9.25% by weight) of metatolylene diisocyanate (undistilled) is added to the flask and the flask temperature brought down to 20-24° C. with a cold water bath. The product is poured and sealed from air and moisture and kept cool (40° F.). This product produces an excellent foam with part B.

(3) Preparation of resin syrup part A with ortho tolylene diisocyanate:

31.7 gms. (31.7% by weight) of pentaerythritol monooleate and 16.1 gms. (16.1% by weight) of pentaerythritol dipropional are mixed and 52.2 gms. (52.2% by weight) of 2,4-tolylene diisocyanate are added. Heat is then applied as in (1) and the product is bodied and cooled to form a syrup of "U" Gardner viscosity. The resulting product is then preserved from air and moisture. This reaction product is similar to the metatolylene diisocyanate syrup and produces a foam of good strength with part B.

II.—Part B may be prepared as follows:

1 part N-methyl morpholine
100 parts anhydrous glycerin.

These two chemicals are merely stirred together and sealed from moisture.

III.—Formulation and effects of variations. Primary factors that affect the character of the final from product may be listed as follows:

(1) Variation of viscosity of part A.

(a) Low viscosity (less than Gardner-Holt U) part A tends to give a coarse product due to the coalescing of many small bubbles to form large cavities.

(b) High viscosity part A (greater than Gardner-Holt Z1) soon becomes too thick to handle after stirring in part B and cannot then be transferred from the mixing container.

(c) Medium viscosity part A (Gardner-Holt XY) is the most desirable product to handle. Such product can be readily transferred from mixing container to desired end use. The resulting product is a very fine, stable, uniform product with appreciable durability.

(2) Variation in density of the foam product is due to the presence of water in the part A—part B mix.

(a) When part A and part B are mixed in the absence of water, the resulting product is quite dense, 40–45 pounds per cubic foot.

(b) The presence of a trace of moisture (0.5% by weight based on part A) will decrease the density of the finished product to about 15 pounds per cubic foot.

(c) The presence of 1% moisture, based on part A, will produce an 8–10 pound foam.

(d) As much as 10% moisture, based on part A, will produce a very friable product ranging from 1–2 pounds per cubic foot. This moisture may be added to part B before mixing the latter with part A, or it may be added to the A—B mix.

In view of all the possible variations just set forth, it is quite evident that no one formula could be given that would satisfy everyone's desires. An average foam product, however, having good structural strength and a density of about 8 pounds per cubic foot may be produced from the following formula:

| | Parts by weight |
|---|---|
| Part A | 100 |
| Part B | 25 |
| Water | 1 |

It will be evident from the foregoing examples that such factors as density, structural stability, etc. of the final product can be varied at will.

As set out above in the specific examples and procedures, if it is desired to produce a foam of exceptionally high density, no water whatever is added and the mixed parts A and B are allowed to react. The resulting foam will be approximately 45 pounds per cubic foot density and will stand 200 pounds and more per square inch compression.

While for the purpose of convenience and for effective storage of the reacting materials, I prefer to form parts A and B separately and later combine them, it will be understood that all of the ingredients may be brought together in a single general operation following a sequence of steps and leading to a setting of the resin at low temperature such as room temperatures or below.

The new type of foam resin product has many advantages over other commercial foam products. It may be formed and cured in situ without external application of heat, thus eliminating costly shaping and tooling operations. It is non-shrinking. It is chemically inert, resistant to fungus and solvents and is exceptionally adhesive to practically every material employed in construction work. It is believed that greater uniformity and continuity of cell wall structure is achieved because the reacting chemicals liberate carbon dioxide within the viscous matrix, whereas many prior foams have been made by introducing carbon dioxide or some other inert gas from external sources. Regardless of the theory, it is nevertheless true that the foam produced by the method described comprises a myriad of voids completely enclosed by a resin wall which is substantially impervious to the transmission of liquids. The new resin foam is not thermoplastic after completion of its polymerization but will lend itself to post-forming after the foam has formed. In a confined space, it will form carbon dioxide on approaching the fire point and will thus dampen out fires started in areas adjacent to it.

The new resin foam may be extended up to and over 100% with various extenders, such as powdered proteins, wood flour, walnut shell flour, cotton flock, fibrous materials, such as hair or wool, asbestos powder or fibre, synthetic fibres and organic and inorganic fillers and extenders of all kinds. One advantage that the resin offers over other materials is the fact that with fillers which are water-sensitive, the isocyanate will react to improve the water-resistance of fillers and at the same time actually include the filler into the molecule.

The intracellular structure provides excellent insulation, while at the same time, due to its high compression strength and cross-linked nature, the foam can be used as an interlayer between laminates and can be subjected to constant pressure without cold flow. Similarly, it may be used in the preparation of synthetic construction members due to its lack of cold flow, good adhesion, high compression strength and low density.

To summarize, the method of this invention can be employed to form cellular thermoset resin bodies, which have very low density and great structural strength. These resin bodies have applications in the field of aviation and electrical equipment. One principal use of the method and product of this invention is as a bonding agent and filler for structural aircraft. The control surfaces and aircraft leading and trailing edges are formed of thin sheets of material such as aluminum, and therefore it is desired to fill the space between the sheets of metal at the edges of these surfaces with a lightweight but strong material. In practicing this invention, this can readily be done by simply pouring into the cavities between the metal sheets a mixture of the casting syrup (part A) and the polyhydric alcohol and tertiary amine catalyst (part B). This mixture will then proceed to react and foam in situ, thereby producing a porous resin filler between the sheets of metal of low density and high structural strength which is bonded directly to the sheets of metal.

While in the foregoing specification, I have set forth specific examples and illustrative procedures in considerable detail, it will be understood that such details may be varied widely by those skilled in the art without departing from the spirit of my invention.

I claim:

1. In a process for forming a porous resin body, the steps of pre-reacting an excess of a tolylene di-isocyanate with a monoester of a fatty acid containing 18 carbon atoms and pentaerythritol in the presence of a pentaerythritol dipropional to form a resinous mass with free isocyanate groups still available, then adding thereto a tertiary amine catalyst and a polyhydric alcohol containing at least 3 active hydrogens, and foaming said mass by mixing it with said added ingredients in the presence of water.

2. In a process for forming a porous resin body, the steps of pre-reacting an excess of a tolylene di-isocyanate with pentaerythritol monostearate in the presence of pentaerythritol dipropional, and finally foaming the reacted product by mixing it with a tertiary amine catalyst and a polyhydric alcohol having at least 3 active hydrogens in the presence of water.

3. In a process for forming a porous resin body, the steps of pre-reacting an excess of a tolylene di-isocyanate with pentaerythritol monooleate in the presence of pentaerythritol dipropional to produce a resinous mass containing free isocyanate groups, and finally foaming the reacted product by mixing it with a tertiary amine catalyst and glycerine in the presence of water.

4. In a process for forming a porous resin body, the steps of pre-reacting an excess of a metatolylene di-isocyanate with pentaerythritol monooleate in the presence of pentaerythritol dipropional to produce a resinous mass containing free isocyanate groups, and finally foaming the reacted product by mixing it with N-methyl morpholine and glycerine in the presence of water.

5. In a process for forming a resinous casting syrup, the step of reacting an excess of an aromatic di-isocyanate with pentaerythritol mono-stearate in the presence of a mutual solvent.

6. In a process for forming a resinous casting syrup, the step of reacting an excess of orthotolylene di-isocyanate with pentaerythritol monooleate in the presence of a pentaerythritol dipropional.

7. In a process for forming a resinous casting syrup, the step of reacting an excess of an aromatic diisocyanate with pentaerythritol mono-oleate in the presence of a mutual solvent.

8. In a process for forming a porous resin body, the steps of pre-reacting an excess of an aromatic diisocyanate with a monoester of a long chain fatty acid containing from about 6 to about 22 carbon atoms and pentaerythritol to form a resinous mass with free isocyanate groups still available, then adding thereto a tertiary amine catalyst and a polyhydric alcohol containing at least 3 active hydrogens and foaming said mass by mixing it with said added ingredients in the presence of water.

9. In a process for forming a porous resin body, the steps of pre-reacting an excess of an aromatic diisocyanate with a monoester of a long chain fatty acid containing 18 carbon atoms and pentaerythritol to form a resinous mass with free isocyanate groups still available, then adding thereto a tertiary amine catalyst and a polyhydric alcohol containing at least 3 active hydrogens and foaming said mass by mixing it with said added ingredients in the presence of water.

10. In a process for forming a porous resin body, the steps of pre-reacting an excess of a tolylene diisocyanate with a monoester of a fatty acid containing 18 carbon atoms and pentaerythritol to form a resinous mass with free isocyanate groups still available, then adding thereto a tertiary amine catalyst and a polyhydric alcohol containing at least 3 active hydrogens and foaming said mass by mixing it with said added ingredients in the presence of water.

11. The process of claim 10 wherein said monoester is pentaerythritol monooleate.

12. The process of claim 10 wherein said monoester is pentaerythritol mono-stearate.

13. In a process for forming a porous resin body, the steps of pre-reacting an excess of a tolylene diisocyanate with pentaerythritol monooleate to produce a resinous mass containing free isocyanate groups, and finally foaming the reacted product by mixing it with a tertiary amine catalyst and glycerine in the presence of water.

References Cited in the file of this patent
UNITED STATES PATENTS

| | | |
|---|---|---|
| 2,284,637 | Catlin | June 2, 1942 |
| 2,511,544 | Rinke et al. | June 13, 1950 |
| 2,577,281 | Simon et al. | Dec. 4, 1951 |
| 2,602,783 | Simon et al. | July 8, 1952 |

OTHER REFERENCES

De Bell et al.: "German Plastics Practice," pages 300–304, 310, 463–465, pub. 1946 by De Bell and Richardson, Springfield, Mass.

Office of Technical Services, Washington, D.C. PB-45246, Jan. 31, 1947, "Interview With Prof. Otto Bayer."

British Plastics, December 1946, pages 539–542.